Patented Apr. 15, 1924.

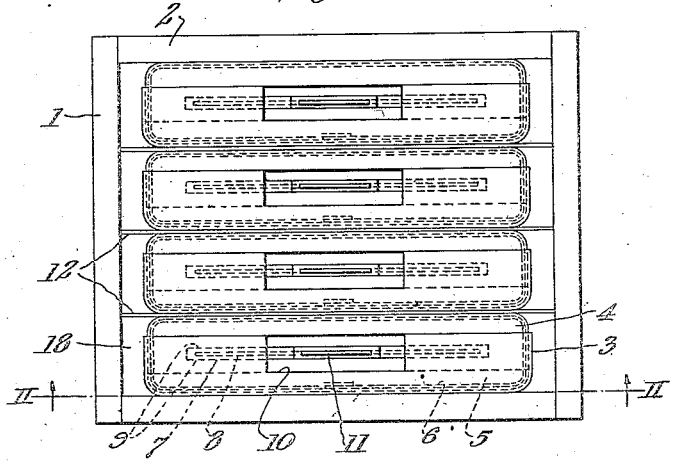
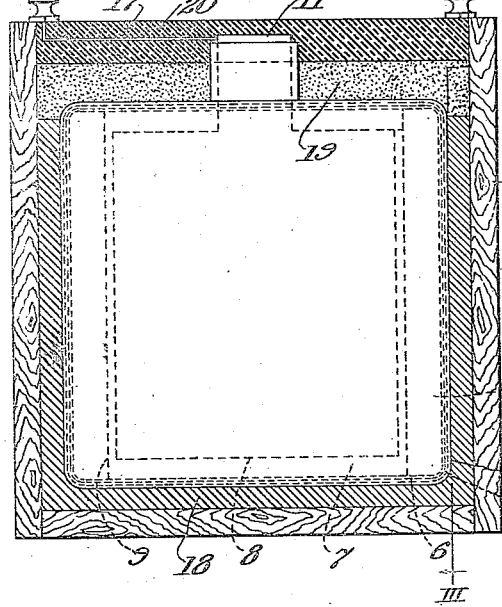
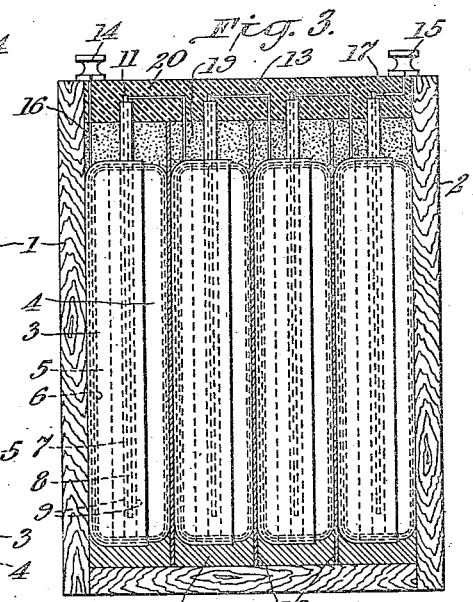

1,490,448

UNITED STATES PATENT OFFICE.

RAYMOND C. BENNER, OF BAYSIDE, AND HARRY H. THOMPSON, OF FLUSHING, NEW YORK, ASSIGNORS TO UNION CARBIDE & CARBON RESEARCH LABORATORIES, INC., A CORPORATION OF NEW YORK.

DRY CELL OF THE FLAT TYPE AND BATTERY FORMED THEREFROM.

Application filed April 12, 1922. Serial No. 551,782.

*To all whom it may concern:*

Be it known that we, RAYMOND C. BENNER and HARRY H. THOMPSON, citizens of the United States, residing at Bayside and Flushing, in the county of Queens and State of New York, have invented certain new and useful Improvements in Dry Cells of the Flat Type and Batteries Formed Therefrom, of which the following is a specification.

This invention relates to dry cells of the flat type, and to batteries formed of a plurality of such cells. More particularly, the invention comprises an improved flat cell having elements adapted to be compressed into efficient current producing relation, and a battery construction in which a suitable number of the cells are retained under pressure within a casing.

The construction described presents certain important advantages over the commonly used battery built up of cylindrical cells. Among these may be mentioned greater compactness of assembly, lower internal resistance owing to compression, and more efficient distribution of the electrode and depolarizing surfaces.

According to the present invention, an improved cell and battery construction for obtaining these and other advantages, is provided. In brief, the construction comprises flat zinc shells adapted to be interfitted to form a substantially rectangular box-like container, for receiving electrolyte and a depolarizing electrode. The cells are assembled under pressure in a casing, and are preferably embedded in a suitable insulating plastic.

The invention will be described in detail in connection with the accompanying drawing, in which—

Fig. 1 is a top plan view of the battery with the cover removed,

Fig. 2 is a vertical section through the battery on line II—II, Fig. 1, and

Fig. 3 is section on line III—III, Fig. 2.

Referring to the drawing, numeral 1 denotes a strong box or casing, which is preferably constructed of wood or other non-conductive material. The side 2 of the casing is removable, for convenience in assembling the cells, as described later.

Each cell comprises telescoping zinc shells 3 and 4. A rectangular block of depolarizing mix 5, wrapped in pasted pulpboard 6, is placed within one of the shells, and the other shell is then fitted in position over it. Instead of pasted pulpboard, any suitable wrapping or coating permeable to electrolyte, and adapted to space the zinc and mix, may be used. The mix is preferably formed about a central composite electrode 7, of the type described in the application of R. C. Benner, Serial No. 534,509, filed Feb. 6, 1922. This electrode may comprise a thin sheet of zinc or other conductive material 8, coated marginally and on both sides with a graphite-containing plastic 9. The shells 3 and 4 are cut away at 10, to permit the passage of a reduced portion 11 extending from one side of the electrode 7.

The battery is assembled as follows: Casing 1 is placed with its open top fronting the operator, as illustrated in Fig. 1, and the side 2 is removed. A cell of the type just described is then laid centrally in the casing, which is preferably of such breadth that a considerable clearance is left between the casing walls and the cell. A sheet of waterproofed pulpboard 12 or other suitable insulating and waterproof material, is then placed in the casing. The pulpboard sheet fits snugly against the casing and extends forwardly beyond the end of the cell. A second cell is then inserted, followed by another pulpboard sheet, and so on alternately until the casing is filled. The stack of cells should extend a suitable distance above the position it will ultimately occupy, in order that the cell may be properly compressed when side 2 is fitted on the casing. A screw press or other suitable means is used to force side 2 into position, and it is nailed or otherwise secured before removing the pressure.

Connectors 13 are attached at one end to the zinc sheets 8 of electrodes 7, where the zinc is exposed at the top of reduced portions 11. The other end of each connector is secured to a zinc shell 3. Binding posts 14 and 15 are connected by wires 16 and 17, respectively, with the anode of one end cell and the cathode of the other.

The battery is placed in upright position, and plastic insulating material 18, such as pitch, is poured in. The cells are retained in spaced relation to the bottom and sides of the casing by the pressure of side 2, and the plastic material flows about them, forming a secure protection against leakage and short-circuiting between the cells. After the plastic has cooled, a layer of sawdust 19, or other suitable porous material, is placed over the cells. A seal 20 of the usual type may then be filled in until flush with the top of the casing walls.

In the construction described, the full expanse of both anode members in each cell is opposed to the depolarizing electrode. This feature, together with the compressed condition of the cells, results in efficient current production and adaptation for heavy service. In addition, the cell and battery of the present invention are characterized by marked simplicity of manufacture and assembly. The zinc shells may be readily formed by stamping from sheet metal, and the composite cathode members may be simply prepared by brushing or spraying plates of conductive material, such as zinc or other metals with a plastic material adapted to harden into a conductive, non-corrodible coating. While we have illustrated a four cell battery, it will be understood that one or more cells may be used as desired.

We claim:—

1. A dry cell comprising a cathode having a metallic core with a non-corrodible, carbonaceous coating thereon, the core extending through one end of the cell and having an uncoated portion, a depolarizing mix about the coating, a permeable spacing member in contact with the mix, and an anode upon each side of the spacing member and compressed upon the spacing member and mix.

2. The invention according to claim 1, in which the anodes are in the form of telescoping zinc cups.

3. A dry cell battery construction comprising a casing, a plurality of cells therein, each of said cells having a flat body of depolarizing mix, an anode member upon each side of the mix in each cell and capable of relative inward movement, and means for pressing the anodes towards each other and for securing them in position while under compression.

4. A dry cell battery construction comprising a casing, a plurality of cells therein, each of said cells having a flat body of depolarizing mix, a carbon-coated cathode having a metal core and embedded in the mix, the core having an exposed contact portion, an anode upon each side of the mix in each cell and capable of relative inward movement, means for connecting the exposed portions of the cathode cores to the proper anodes, and means for pressing the anodes towards each other and for securing them in position while under compression.

5. A dry cell battery construction comprising a casing, a plurality of cells therein, each of said cells comprising interfitting anode members forming the exterior of the cell, means for holding the cells under compression in spaced relation to the ends and bottom of the casing, means for insulating the anodes of adjacent cells from each other, means for electrically connecting the cells, and a plastic sealing material substantially surrounding the anode members and sealing the same.

6. The invention according to claim 5, in which the cathodes are carbon-coated metal sheets having a narrowed portion extending through one end of the cell.

In testimony whereof, we affix our signatures.

RAYMOND C. BENNER.
HARRY H. THOMPSON.